Sept. 16, 1952 L. M. POUGET 2,610,571
APPARATUS FOR THE PREPARATION OF STEEPED BEVERAGES
Filed June 5, 1948 2 SHEETS—SHEET 1

Inventor
Louis Marcel Pouget

Sept. 16, 1952     L. M. POUGET     2,610,571
APPARATUS FOR THE PREPARATION OF STEEPED BEVERAGES
Filed June 5, 1948            2 SHEETS—SHEET 2

Patented Sept. 16, 1952

2,610,571

UNITED STATES PATENT OFFICE 2,610,571

APPARATUS FOR THE PREPARATION OF STEEPED BEVERAGES

Louis Marcel Pouget, Les Garennes, near Vallieres, France

Application June 5, 1948, Serial No. 31,246
In France June 6, 1947

11 Claims. (Cl. 99—317)

This invention is concerned with apparatus for the preparation of steeped beverages and more particularly with apparatus provided with a strainer.

For the obtainment of satisfactory results, the products used in the preparation of steeped beverages should not simply be leached; it is rather necessary that the apparatus used and the substance itself should be heated progressively to a definite temperature which should not be exceeded.

The invention has for its object a method and an apparatus by means of which the product to be steeped, preliminarily heated in a receptacle having capillary holes at its upper part and provided at its lower part with an outlet orifice adapted to be closed, receives hot water only in reduced amounts through the capillary holes at the will of the user under the effect of the vacuum produced in said receptacle either by the air expelled out of the receptacle or by the beverage flowing through the outlet orifice.

Several embodiments of an apparatus according to the invention are illustrated by way of example in the appended drawing.

Figure 1:
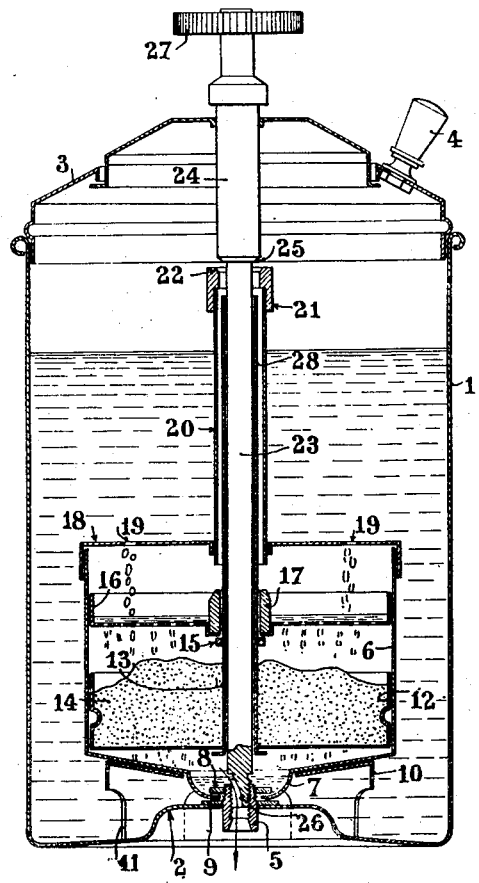
Figure 1 is a vertical section of a first embodiment.

As shown in Fig. 1 the apparatus comprises a kettle in the form of a substantially cylindrical receptacle 1 made of any suitable material, preferably of aluminum or some other light metal or alloy. The kettle bottom is formed with an inwardly projecting boss 2. The vessel may remain open, although it can be designed to receive a gas-tight cover 3 contingently carrying a warning whistle 4 such as usually provided on apparatus of that kind. The bottom of the kettle is also provided with a central aperture in which a sleeve having an inner thread is fitted and secured by soldering or otherwise. The device used in the preparation of steeped beverages consists of a strainer received in a cylindrical metal box 6 with an inwardly sloping conical bottom depressed in its central portion which is provided with a central aperture the diameter of which is substantially equal to the outer diameter of sleeve 5, whereby said box can be fitted on said sleeve. The latter is provided at its upper end with an external thread on which a nut 8 can be threaded by means of which the box can be secured on the central boss of the kettle with the interposition of a washer 9. In order to improve the stability of the box 6 that contains the strainer, said box may be rested at its periphery on a ring 10 concentric with the boss 2, which ring in turn is rested or secured on the bottom of the kettle. Said ring is apertured as shown at 11. The diameter of the box 6 is decidedly less than the inner diameter of the kettle, the whole being so arranged that an annular space is provided between the outside of the box and the inside of the kettle while the bottom of the box stands at a certain distance above the bottom of the kettle.

Slidably received in the box 6 is a cup-like member or basket 12, the flat bottom of which is provided with a great many tiny holes surrounding a central aperture that extends upwards in a tube 13. The bottom of the basket 12 rests at the periphery thereof on the bottom of box 6, an empty space being left therebetween. The basket is designed to contain the coffee or equivalent substance to be steeped.

Secured on the tube 13 at some distance above the upper edge of the basket 12 is a stop ring 15 to serve as a rest for a circular distributing basket 16 which likewise is slidably received in the box 6; provided in the flat bottom of said basket are a multiplicity of tiny holes and a central aperture which extends in a sleeve 17 which has a snug fit on tube 13.

The box 6 is closed at the top thereof by a cover 18 which has a tight fit on the outside of the box and in which a few capillary holes 19 are provided. Secured in a central circular aperture in the cover is a tube 20 which extends vertically to a certain height in the kettle and which loosely surrounds the tube 13 the height of which is a little less. Secured on the upper end of tube 20 is a gasket 21 formed in its upper orifice with a conical seat 22.

Screwed in the tube 5 is the lower end of a central rod 23 the diameter of which is enlarged at its upper end as shown at 24 to form a conical shoulder 25 adapted to coöperate with the conical seat 22 in the gasket 21. Milled in the lower end of rod 23 is a longitudinal groove 26 that extends from the end of the rod to a certain distance above the same. The parts are so dimensioned that the upper end of the groove 26 is completely engaged within the sleeve 5 when the conical shoulder 25 is resting on its seat 22. The upper end of the enlargement 24 terminates in an operating knob 27. In the embodiment illustrated said enlarged end of the rod projects through the cover 3 of the kettle and the knob 27 is located outside the same. However, said knob may also be located within the kettle which contingently may be used without any cover.

The apparatus as described may be laid on any suitable gas or electric cooking range, although the heating means may also be combined with the apparatus as an annular heating element (not shown) arranged in the annular space surround the box 6 above the bottom of the kettle or at any other convenient place, the level of the water lowering only after stopping of the heating step.

The apparatus is used as follows:

The rod 23 is unscrewed and removed completely with the aid of knob 27. Likewise, the cover 18 is removed with the aid of tube 20, and so is the basket 16 by moving the latter along the tube 13 of the basket 12 which remains in position. Coffee powder or any other substance to be steeped is then filled into the basket 12 in the form of a loose heap as shown at 14, care being taken that the level of the stop ring 15 is not exceeded. The basket 16 is then seated again on the stop ring 15 and the box 6 closed with its cover 18, whereafter the rod 23 is inserted again and screwed home in the sleeve 5, whereby the latter is closed altogether since the upper end of groove 26 is completely engaged. Consequently, the inside of the box 6 is completely cut out from the outside. At the same time the conical shoulder 25 will engage its seat 22 in the gasket 21, with the result that any communication between the inside of the box 6 and the inside of the kettle can only occur through the capillary holes 19.

The kettle is then filled with cold, warm or hot water up to a level below the conical shoulder 25, i. e. below the upper orifice of tube 20. In spite of the communication established through the holes 19 in the cover 18, no water can enter the box since the said capillary holes are too small in diameter to make an exchange of the fluids possible at atmospheric pressure.

Where e. g. cold water is used, same is heated to boiling temperature by laying the kettle on any suitable heat source. The water that surrounds the box 6 is brought progressively to boiling temperature while as a result of the heat transmitted thereby the product to be steeped and contained in the box is heated in a water-bath. Consequently, the aroma is expelled from the substance and the latter is well prepared prior to any contact with the hot water. On the other hand, the air present in the box is expanded and partly expelled through the capillary holes as bubbles that will burst at the surface of the liquid present in the kettle.

Once the water has reached boiling temperature, heating is discontinued and the apparatus is allowed to stand for a while. As the temperature sinks, the residual air present in the box contracts, whereby a vacuum is created therein by the action of which the water in the kettle is sucked into the box and falls into the basket 16 by which it is distributed uniformly over the substance heaped in the lower basket 12. Water will go on oozing into the box 6 until equality in the pressures is obtained. Owing to the fact that sleeve 5 is closed by the lower end of rod 23 no liquid can flow out therethrough, so that the water will reach a certain level in the box 6 and completely soak the substance 14, which is allowed to steep for a reasonable time.

For the purpose of pouring out the beverage, the rod 23 is unscrewed with the aid of the knob 27 until the upper end of the groove 26 is clear from the upper end of the sleeve 5. As a consequence, the valve cone 25 is lifted clear of its seat 22 so that air can enter the box 6 from the outside through the annular space 28 between tube 20 and tube 13, whereby the beverage can flow out through sleeve 5 and can be consumed immediately.

The operation is the same where hot water is used, except it is not necessary to set the apparatus on a heat source.

In some instances, notably with large apparatus, it may be desirable to maintain the heating up to or even after the end of the steeping process in order to keep the beverage at a uniform temperature as it is drawn off.

In addition to the advantages arising as already stated from the water-bath heating of the substance and from its being watered as a result of a suction effect due to the thermal expansion of the air present in the box 6, it should be pointed out that the substance is removed from the action of moisture for the whole duration of the heating step that precedes the steeping step.

The box 6 is in direct contact with the water in the kettle all over its surface and remains tightly closed throughout the period of preparation, which is favorable to satisfactory development of the aroma and to the efficiency of the steeping process.

Irrespective of the fineness of the substance in the box the liquid in the kettle is removed from any direct contact with said substance for the whole length of the percolation step.

The tube 20 extends somewhat below the cover 18. Consequently, when the level of the liquid has risen up to the lower end of the tube 20, an air cushion entrapped between the level of the liquid and the cover prevents the product to be steeped from escaping into the water in the kettle.

In contrast to automatic apparatus in which the substance is leached with water under normal pressure or with a mixture of hot water and steam in fluid-tight vessels, the substance is watered in the apparatus according to the invention as a result of a vacuum which is created within the box 6 and which in addition controls the amount of water admitted thereinto as well as the maintenance of a certain mass of air, by which the watering of the substance is stopped automatically as soon as pressure equality is reestablished.

The apparatus according to the invention is not liable to explode since it is operated under normal pressure, the cover 3 being dispensed with if desired. In the particular case of the apparatus illustrated in Fig. 1, heating may be discontinued as soon as a warning is given by the whistle 4 that the water is boiling. In fact, said whistle will perform the function of a safety valve by precluding any rise in the pressure within the kettle, which rise after all is useless for the reasons already explained.

The apparatus can be manufactured at low cost since most of its parts can be punched or pressed from e. g. sheet aluminum, contingently without any welding step.

The strainer and the kettle can be filled quite readily and the parts are so shaped that they will resist any not too rough handling and can be cleaned easily.

As far as the quality of the beverage is concerned it is immaterial that cold, warm or hot water is used initially.

In the embodiment illustrated in Fig. 1 the receptacle 1 surrounds the box 6 completely. The apparatus may however be so designed that the receptacle encloses only a part of the box. Moreover, the sealing means may be designed otherwise than as shown in Fig. 1.

Figure 2:
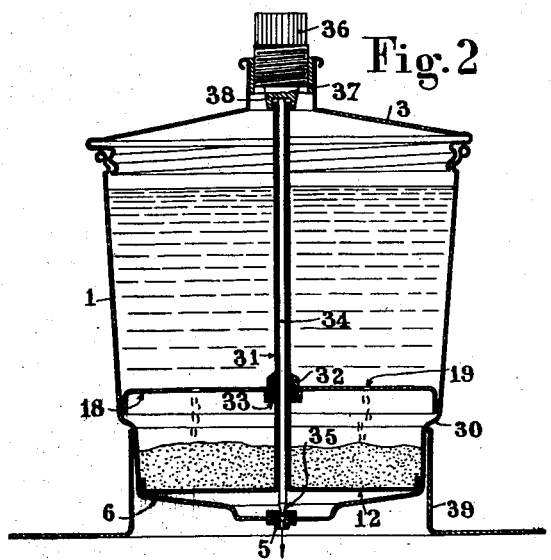
Figure 2 is a vertical section of a further embodiment.

Thus, in the apparatus illustrated in Fig. 2, the box 6 is solid with the receptacle 1; the perforated cover 18 rests on a shoulder 30 of said receptacle 1. Secured to the strainer 12 and opening into the space therebelow is a tube 31 fitted in a fluid-tight sleeve or gasket 32 received in an aperture 33 provided in the cover. The tube 31 extends upwards above the maximum level of the liquid in the receptacle 1. Projecting with a certain amount of play through the tube 31 is a spindle valve 35, the lower conical end 35 of which coöperates with the sleeve 5 while its upper end carries a screw plug 36 coöperating with a tapped neck 37 on the cover 3 of the receptacle 1. The said screw plug 36 is formed at its lower end with a central recess 38 adapted to close the top orifice of tube 31 at the same time as the sleeve 5 is closed by the needle valve 35. A sleeve 39 on which a shoulder 30 of the receptacle 1 is rested serves to seat the whole apparatus on a cup, a glass or any other vessel. It will be appreciated that the apparatus according to Fig. 2 operates in the same manner as the one shown in Fig. 1.

The closing means used in the embodiment shown in Fig. 1 may be used in connection with the apparatus illustrated in Fig. 2 and conversely, both of said closing means are controlled with the aid of one single rod.

Figure 3:
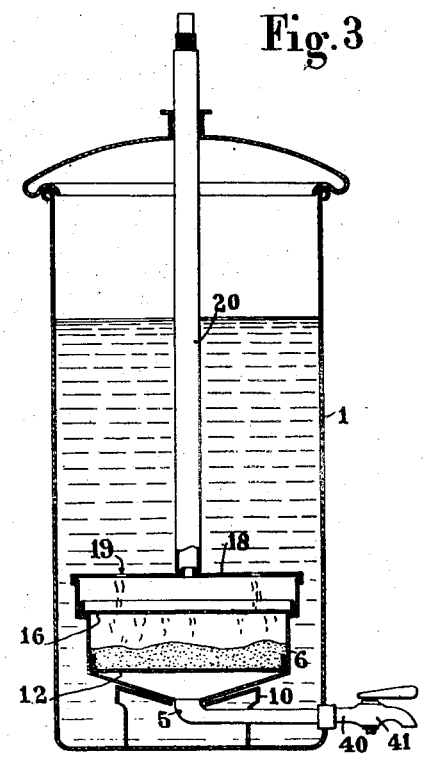
Figure 3 is a vertical section of a third embodiment.

However, it is also possible to provide for a separate control as shown diagrammatically in Fig. 3; the apparatus illustrated therein is similar to the one shown in Fig. 1 except the sleeve 5 extends in a spout 40 controlled by a hand-operated cock 41. The tube 20 secured to the cover 18 of box 6 extends above the receptacle 1 and is closed by a separate plug 42. After having introduced the product to be steeped into the box 6, closed the cock 41 and put on tube 20 the plug 42, the user fills the kettle 1 with hot water or he fills the kettle with cold water and heats said water by means of any suitable heating device. The product to be steeped becomes thus warm and air escapes from the box 6 through the holes 19. The heating step is then stopped, and as the temperature decreases, air in the box is contracted and vacuum is produced, whereby water enters into the box and is distributed over the coffee or other product to be steeped. If it is desired at any moment to stop the arrival of water in the box 6, it will be sufficient to remove the plug 42: air will enter the box 6, the pressure in the box will be equal to the atmospheric pressure and water will no longer ooze through the capillary holes. If cock 41 is then opened, the steeped beverage will flow through the sleeve 5 and the tube 40, while due to the resulting vacuum produced in the box 6, water of the kettle 1 will enter the box 6 in proportion of the amount of beverage flowing out through the tube 40.

It is also possible to use the apparatus with the plug 42 always removed from the tube 20. In such a case, when the product to be steeped has been heated, equilibrium between the pressures is always maintained, and water enters the box 6 only in proportion of the beverage flowing out of said box. It is obviously possible to continue heating of the kettle 1 as long as desired.

In all the apparatus disclosed hereinbefore the steeping process may be divided into the following steps:

1. *Pre-heating the substance prior to its watering.*—As a result of the heating action of the water the air present in the gas-tight box finds its only way out through the capillary holes in the box cover and bubbles up through the mass of water present in the top portion of the receptacle.

2. *Macerating the substance.*—As a result of the escape of part of the air from the box and of the subsequent decrease in the temperature a vacuum is created by the action of which a corresponding amount of water is sucked in through the capillary holes until the pressures become equal. The maceration of the substance with a limited amount of hot water can then be carried on for any desired time.

3. *Percolation through a limited amount of macerated substance.*—As the needle valve is unscrewed, air is admitted together with water into the box, and due to the equalization of the pressures an air pocket is formed below the cover by the permanent action of which the water supply is adjusted automatically in direct relation with the amount of beverage drawn off.

It is to be understood that the invention is not limited to the examples described hereinbefore since many modifications may be made in the various parts of the apparatus and particularly in the flow-controlling members without thereby departing from the scope of the invention as defined in the following claims.

What I claim as new is:

1. An apparatus for the preparation of steeped beverages comprising in combination a box designed to contain the substance to be steeped, a beverage draw-off duct leading from the bottom of said box, means to control the outflow from said duct, a strainer at the bottom of said box through which the beverage can flow towards the draw-off duct while the substance steeped is retained in the box, a cover on said box provided with capillary holes, a receptacle adapted to contain a liquid and the side walls of which extend around and above said cover, a tube projecting through the cover and the receptacle, one end of which opens into the box while its other end opens in the atmosphere above the maximum level of the liquid in the receptacle, and means to close said tube whereby the inside of the box can be connected with or cut off from the surrounding air.

2. An apparatus according to claim 1 comprising in addition a spindle extending through the tube leading from the box towards the surrounding air and provided on the one hand with means to close the beverage draw-off duct and on the other hand with means to close the tube leading to the outside, whereby the outflow of liquid and the inflow of air can be controlled by one single displacement of said spindle.

3. An apparatus for the preparation of steeped beverages comprising in combination a box designed to contain the substance to be steeped, a beverage draw-off duct leading from the bottom of said box, means to control the outflow from said duct, a strainer at the bottom of said box through which the beverage can flow towards said draw-off duct while the substance steeped is retained in the box, a cover on said box provided with capillary holes, a receptacle designed to receive a liquid, the walls of which extend around and above the cover, a tube projecting through said cover and the receptacle, one end of which opens into the box while its other end opens into the atmosphere above the maximum level of the liquid in the receptacle, said tube being secured in fluid-tight manner on the cover, and means to establish or cut out the flow through said tube.

4. An apparatus according to claim 3, in which said tube extends somewhat below said cover, whereby an air pocket is entrapped under said cover and prevents the substance to be steeped from mixing with the water in the receptacle.

5. An apparatus for the preparation of steeped beverages comprising in combination a box designed to contain the substance to be steeped, a beverage draw-off duct leading from the bottom of said box, means to control the outflow from said duct, a strainer at the bottom of said box through which the beverage can flow towards said draw-off duct while the substance steeped is retained in the box, a cover on said box provided with capillary holes, a receptacle designed to receive a liquid, the walls of which extend around and above said cover, a tube projecting through said cover and the receptacle, one end of which opens into the box while its other end opens into the atmosphere above the maximum level of the liquid in the receptacle, said tube projecting in fluid-tight manner through the cover and being secured to the strainer, and means to establish or cut out the flow of air through said tube.

6. An apparatus according to claim 1 wherein the box is completely enclosed in the receptacle.

7. An apparatus for the preparation of steeped beverages comprising in combination a receptacle adapted to contain a warm liquid and provided in its bottom wall with an outlet orifice, a box designed to contain the substance to be treated and contained in the lower part of said receptacle and provided in its bottom wall with a draw-off orifice located just above and adjacent to said outlet orifice of said receptacle, tubular connecting means opening on one side in said box and on the other side out of said receptacle and extending through said draw-off orifice and through said outlet orifice and clamping the bottom of said box on the bottom of said receptacle so as to connect securely said box on said receptacle in a fluid tight manner, a cover on said box provided with capillary holes, and means to control the outflow through said tubular connecting means.

8. An apparatus according to claim 1, wherein the whole receptacle is arranged above the cover of the box, said cover providing the bottom of said receptacle.

9. An apparatus for the preparation of steeped beverages comprising in combination a receptacle provided with an outlet orifice in its bottom wall and with an annular shoulder on its inner lateral surface, a strainer on the bottom of said receptacle adapted to support the substance to be treated, a cover provided with capillary holes and adapted to be supported on said annular shoulder above said strainer, and means to control the outflow through said outlet orifice.

10. An apparatus for the preparation of steeped beverages comprising in combination a box designed to contain the substance to be steeped and provided with a draw-off orifice in its bottom wall, a cover on the upper edge of said box provided with capillary holes, and a receptacle adapted to contain warm liquid and the side walls of which extend around and at least above said cover.

11. An apparatus for the preparation of steeped beverages comprising in combination a box designed to contain the substance to be steeped and provided with a draw-off orifice in its bottom wall, a cover on the upper edge of said box provided with capillary holes, means to control the outflow through said draw-off orifice, and a receptacle adapted to contain a warm liquid and the side walls of which extend around and at least above said cover.

LOUIS MARCEL POUGET.

REFERENCES CITED

The following references are of record in the file of this patent:

UNITED STATES PATENTS

| Number | Name | Date |
| --- | --- | --- |
| 28,803 | Yates | June 19, 1860 |
| 1,008,602 | Lake | Nov. 14, 1911 |
| 2,107,236 | Cory | Feb. 1, 1938 |
| 2,152,792 | Davis | Apr. 4, 1939 |
| 2,209,831 | Schurig | July 30, 1940 |
| 2,224,672 | Davis | Dec. 10, 1940 |
| 2,263,610 | Cain | Nov. 25, 1941 |
| 2,319,511 | Neshaim | May 18, 1943 |